(12) United States Patent
Durrani et al.

(10) Patent No.: US 12,275,291 B2
(45) Date of Patent: Apr. 15, 2025

(54) SYSTEM FOR AIR-CONDITIONING THE AIR OF A PASSENGER COMPARTMENT AND FOR HEAT TRANSFER BY WAY OF COMPONENTS OF A POWERTRAIN OF A MOTOR VEHICLE, AS WELL AS METHOD FOR OPERATING THE SYSTEM

(71) Applicant: Hanon Systems, Daejeon (KR)

(72) Inventors: Navid Durrani, Kerpen (DE); Martin Hötzel, Ratingen (DE)

(73) Assignee: HANON SYSTEMS, Daejeon (KR)

( * ) Notice: Subject to any disclaimer, the term of this patent is extended or adjusted under 35 U.S.C. 154(b) by 284 days.

(21) Appl. No.: 17/756,785

(22) PCT Filed: May 27, 2021

(86) PCT No.: PCT/KR2021/006575
§ 371 (c)(1),
(2) Date: Jun. 2, 2022

(87) PCT Pub. No.: WO2021/242018
PCT Pub. Date: Dec. 2, 2021

(65) Prior Publication Data
US 2023/0339293 A1    Oct. 26, 2023

(30) Foreign Application Priority Data

May 29, 2020 (DE) .................. 10 2020 114 454.7
May 20, 2021 (DE) .................. 10 2021 113 140.5

(51) Int. Cl.
*B60H 1/32*    (2006.01)
*B60H 1/00*    (2006.01)

(52) U.S. Cl.
CPC ..... *B60H 1/32284* (2019.05); *B60H 1/00278* (2013.01); *B60H 2001/00307* (2013.01);
(Continued)

(58) Field of Classification Search
CPC ........... B60H 2001/00307; B60H 2001/00949; B60H 2001/00928; B60H 1/32284; B60H 1/00278
See application file for complete search history.

(56) References Cited

U.S. PATENT DOCUMENTS 9,810,465 B2 * 11/2017 Kang ................ F25B 49/02
10,173,491 B2 * 1/2019 Kim ................. B60H 1/00007
(Continued)

FOREIGN PATENT DOCUMENTS

DE    112012001744 T5    1/2014
DE    102016121362 A1    5/2018
(Continued)

*Primary Examiner* — Devon Russell
(74) *Attorney, Agent, or Firm* — James D. Miller; Shumaker, Loop & Kendrick, LLP

(57) ABSTRACT

A system for air-conditioning the air in a passenger compartment and for heat transfer by way of components of a power train, in particular an electric powertrain of a motor vehicle. The system exhibits one coolant circuit with two refrigerant-coolant heat exchangers and one coolant-air heat exchanger for heat transfer to the ambient air, as well as one refrigerant circuit with one first refrigerant-air heat exchanger for heating the supply air for the passenger compartment, one second refrigerant-air heat exchanger for heat transfer by way of the ambient air, with one upstream first expansion element, one first flow path with one third refrigerant-air heat exchanger for conditioning the supply air for the passenger compartment, with one upstream second expansion element and one second flow path with one first refrigerant-coolant heat exchanger with one upstream third expansion element.

23 Claims, 5 Drawing Sheets

(52) U.S. Cl.
CPC .............. *B60H 2001/00928* (2013.01); *B60H 2001/00949* (2013.01)

(56) References Cited

U.S. PATENT DOCUMENTS

| | | | | |
|---|---|---|---|---|
| 2015/0217627 A1* | 8/2015 | Kang | ................. | B60H 1/00921 |
| | | | | 62/324.6 |
| 2017/0361677 A1* | 12/2017 | Kim | .................... | H01M 10/663 |
| 2019/0135075 A1* | 5/2019 | Hwang | .............. | B60H 1/00278 |
| 2019/0263223 A1* | 8/2019 | Durrani | ............. | B60H 1/00921 |
| 2019/0381857 A1* | 12/2019 | Lee | ..................... | H01M 10/613 |
| 2020/0070628 A1* | 3/2020 | Tan | ........................ | F25B 47/02 |

FOREIGN PATENT DOCUMENTS

| | | | | | |
|---|---|---|---|---|---|
| DE | 102018221280 | A1 | | 6/2020 | |
| DE | 102020107111 | A1 | * | 11/2020 | ......... B60H 1/00278 |
| JP | 2015186989 | A | | 10/2015 | |
| KR | 20190132733 | A | | 11/2019 | |
| KR | 20200008516 | A | | 1/2020 | |
| KR | 20200021605 | A | | 3/2020 | |

* cited by examiner

SYSTEM FOR AIR-CONDITIONING THE AIR OF A PASSENGER COMPARTMENT AND FOR HEAT TRANSFER BY WAY OF COMPONENTS OF A POWERTRAIN OF A MOTOR VEHICLE, AS WELL AS METHOD FOR OPERATING THE SYSTEM

CROSS REFERENCE TO RELATED APPLICATIONS

This is a U.S. national phase patent application of PCT/KR2021/006575 filed May 27, 2021 which claims the benefit of and priority to German Pat. Appl. No. 10 2021 113 140.5 filed on May 20, 2021 and German Pat. Appl. No. 10 2020 114 454.7 filed on May 29, 2020, the entire contents of each of which are incorporated herein by reference.

TECHNICAL FIELD

The invention relates to a system for air-conditioning the air of a passenger compartment and for heat transfer by way of components of a power train, in particular an electric powertrain of a motor vehicle. The system exhibits one coolant circuit with refrigerant-coolant heat exchangers and one coolant-air heat exchanger for heat transfer to the ambient air, as well as one refrigerant circuit. The refrigerant circuit is produced with refrigerant-air heat exchangers used to heat the supply air for the passenger compartment, and for heat transfer by way of the ambient air, as well as with expansion elements, wherein the refrigerant circuit exhibits different flow paths. Furthermore, the invention relates to a method for operating the system.

BACKGROUND ART

Motor vehicles with different drive concepts are known from prior art. The concepts are based on drives by way of a combustion engine, an electric motor or a combination of both motor types. Consequently, motor vehicles with a combination of a combustion engine drive and an electric motor drive exhibit a hybrid drive so that the motor vehicle can be driven either by an electric motor or by a combustion engine, or by both an electric motor and a combustion engine, wherein motor vehicles with a hybrid drive, whose batteries can be charged both via the combustion engine and on the electric supply mains and which are designated as plug-in hybrid or briefly PHEV for "plug-in hybrid electric vehicles", are mostly produced with a battery that is more powerful than those of a motor vehicle whose battery can be charged exclusively via the combustion engine.

On the one hand, conventional motor vehicles with an electric or a hybrid drive mostly exhibit higher cold demands than power vehicles fitted with a drive that is driven purely by a combustion engine, due to the fact that they are produced with additional components, such as a high-voltage battery, an internal charging unit, a transformer, an inverter, as well as the electric motor. In addition to the refrigerant circuit of the air-conditioning system, hybrid electric vehicles (HEV) are produced with a coolant circuit in which the coolant circulating to dissipate the heat emitted by the drive components is routed through an air-cooled heat exchanger.

In particular, in order to maintain the permissible temperature limits of the high-voltage battery, either the coolant circuit with an additional refrigerant-coolant heat exchanger for thermal coupling with the refrigerant circuit of the air-conditioning system is intended for cooling of the battery or a heat exchanger directly cooled with coolant and produced as a battery cooler. The coolant-refrigerant heat exchanger operated for battery cooling as an evaporator of the refrigerant is also called chiller.

As known, a system for heat distribution of a PHEV consequently exhibits at least one refrigerant circuit and one coolant circuit.

On the other hand, electric vehicles and vehicles with hybrid drive, as well as fuel cell vehicles and vehicles driven by a highly efficient combustion engine produce not sufficient waste heat, as known, in order to heat the passenger compartment at low ambient temperatures in accordance with the requirements of thermal comfort.

An electric heater produced as a PTC heater, for example, for heating the supply air flowing into the passenger compartment represents a first, inexpensive and mounting-space-saving solution. Systems provided with a PTC heater, however, exhibit high energy consumption at low exhaust temperatures of the supply air for heating of the passenger compartment. In addition, the range of battery electric vehicles (BEV) is reduced by the electric supplementary heater that cannot be operated in an energy-efficient manner.

A second, energy-saving solution is an air-conditioning system with heat pump function which uses different heat sources and heat sinks, but requires significantly larger mounting space than the first solution with electric heater.

SUMMARY

The formation of air-conditioning systems with heat pump function for heat distribution inside battery electric vehicles (BEV), which are known from prior art, is highly complex and requires a plurality of components, both on the refrigerant side, coolant side, and on the air side, which produces high system costs.

The task of the invention is provision of a system for air-conditioning the air in the passenger compartment and for heat transfer by way of the drive components of a motor vehicle, in particular for motor vehicles with a pure electric drive or a combined electric-motor and combustion-engine drive. In addition to comfortable heating of the supply air for the passenger compartment, it must also be possible to use the system for conditioning the components of the powertrain, in particular also to maintain the temperature for the high-voltage battery of the electrical drive, using different heat sinks and heat sources. The system is to be designed in such a way that it exhibits high flexibility and functionality, in particular operation in a large number of different operating modes, with simultaneously low complexity and maximum efficiency in operation at all times. The manufacturing, maintenance and operating costs, as well as the required mounting space for the system are to be minimal.

The task of the invention is solved by way of the objects with the features as shown and described herein.

The task is solved by way of a system according to the invention for air-conditioning the air in a passenger compartment and for heat transfer by way of components of the powertrain, in particular the electric powertrain of a motor vehicle, also by way of connecting different heat sources and heat sinks, also referred to as a heat flow management system.

For example, an electric motor, an internal charging unit, a transformer or an inverter are regarded as components of the electric powertrain of a motor vehicle. A battery, in particular a high-voltage battery, can also be regarded as a component of the electric powertrain.

The system exhibits one refrigerant circuit and at least one coolant circuit. The coolant circuit is produced with one first refrigerant-coolant heat exchanger, one second refrigerant-coolant heat exchanger, and one coolant-air heat exchanger for heat transfer to the ambient air.

The refrigerant circuit exhibits one compressor, one first refrigerant-air heat exchanger for heating the supply air for the passenger compartment, and one second refrigerant-air heat exchanger for heat transfer by way of the ambient air, with an upstream expansion element. In addition, the refrigerant circuit is produced with one first flow path and one second flow path, wherein one third refrigerant-air heat exchanger for conditioning the supply air for the passenger compartment, with one upstream second expansion element, is arranged inside the first flow path, and the first refrigerant-coolant heat exchanger for heat transfer between the coolant for maintaining the temperature of at least one first drive component of the motor vehicle, such as the battery, and the refrigerant, with one upstream third expansion element, is arranged inside the second flow path. The first flow path and the second flow path are produced in such a way that they each extend from one branch-off point up to one merging point and can be supplied with refrigerant independently of each other and simultaneously.

According to the concept of the invention, the refrigerant circuit exhibits one third flow path with the second refrigerant-coolant heat exchanger for cooling components of the powertrain, such as the internal charging unit, the transformer or the inverter, and one upstream fourth expansion element, wherein the third flow path is arranged in the flow direction of the refrigerant downstream of the first flow path and the second flow path, in particular the merging point of the first flow path and the second flow path.

With formation of the fourth expansion element inside the third flow path, the third refrigerant-air heat exchanger for conditioning the supply air for the passenger compartment inside the first flow path and the first refrigerant-coolant heat exchanger inside the second flow path can be operated both as an evaporator and as a condenser/gas cooler for the refrigerant. The expansion elements are each produced preferably as expansion valves.

If liquefaction of the refrigerant is performed in undercritical operation, for example, with the refrigerant R134a or, at certain ambient conditions, with carbon dioxide, the heat exchangers are referred to as condensers. A part of the heat transfer is performed at constant temperature. In overcritical operation or in case of overcritical output of heat in the heat exchanger, the temperature of the refrigerant is reduced continuously. In this case, the heat exchanger is also referred to as gas cooler. Overcritical operation can occur under certain ambient conditions or operating modes of the refrigerant circuit, for example, with carbon dioxide as the refrigerant.

According to a preferred embodiment of the invention, the refrigerant circuit in the second flow path is produced with one first bypass flow path around the first refrigerant-coolant heat exchanger and the third expansion element, in particular in order to reduce the pressure loss of the refrigerant when the system is operated in modes in which no heat is to be transferred in the first refrigerant-coolant heat exchanger. The first bypass flow path around the first refrigerant-coolant heat exchanger and the third expansion element exhibits preferably one shut-off valve.

According to a further embodiment of the invention, one fourth flow path is intended inside the refrigerant circuit, wherein the third flow path and the fourth flow path can be supplied with refrigerant independently of each other and simultaneously and are produced in such a way that they each extend from one branch-off point up to one merging point.

The branch-off point of the third flow path and of the fourth flow path can be produced together with the merging point of the first flow path and the second flow path, meaning as one component, especially as a branch-off point with four connections.

The fourth flow path is, preferably in the flow direction of the refrigerant, produced with one shut-off valve and one accumulator.

In accordance with a further advantageous embodiment of the invention, the refrigerant circuit exhibits one second bypass flow path around the second refrigerant-air heat exchanger for heat transfer by way of the ambient air and the first expansion element. The second bypass flow path extends from one branch-off point up to one merging point, wherein the branch-off point is arranged between the first refrigerant-air heat exchanger for heating the supply air for the passenger compartment and the first expansion element that is arranged upstream of the second refrigerant-air heat exchanger for heat transfer by way of the ambient air, and the merging point is arranged between the second refrigerant-air heat exchanger for heat transfer by way of the ambient air and the first branch-off point.

The second bypass flow path around the second refrigerant-air heat exchanger for heat transfer by way of the ambient air and the first expansion element preferably exhibit a shut-off valve.

A special advantage of the invention is that the refrigerant circuit exhibits one circuit-internal heat exchanger which is arranged, on the one hand, between the second refrigerant-air heat exchanger for heat transfer by way of the ambient air, and the branch-off point of the first flow path and the second flow path and, on the other hand, inside the fourth flow path, in particular downstream of the accumulator in the flow direction of the refrigerant.

The circular-internal heat exchanger serves, in general for heat transfer between the refrigerant at high pressure and the refrigerant at low pressure, wherein, on the one hand, the liquid refrigerant is cooled down further after the condensation or liquefaction, for example, and, on the other hand, the suction gas upstream of the compressor is overheated.

According to a further embodiment of the invention, the refrigerant circuit exhibits one third bypass flow path around the first refrigerant-air heat exchanger for heating the supply air for the passenger compartment. The third bypass flow path extends from one branch-off point that is arranged between the compressor and the first refrigerant-air heat exchanger up to one merging point that is arranged between the first refrigerant-air heat exchanger and the first expansion element that is arranged upstream of the second refrigerant-air heat exchanger for heat transfer by way of the ambient air. The branch-off point of the third bypass flow path is produced preferably as a three-way valve.

According to a further preferred embodiment of the invention, the coolant circuit exhibits two coolant partial circuits which are thermally coupled with the refrigerant circuit, wherein the first refrigerant-coolant heat exchanger is produced as a thermal connection between the refrigerant circuit and one first coolant partial circuit, and the second refrigerant-coolant heat exchanger as a thermal connection between the refrigerant circuit and one second coolant partial circuit of the coolant circuit.

The first coolant partial circuit exhibits preferably one first feeding device and one first coolant-heat exchanger, whereas the second coolant partial circuit exhibits preferably one second feeding device and one second coolant-heat exchanger, wherein the first coolant-heat exchanger is produced preferably to maintain the temperature of one first component of the powertrain of the motor vehicle, in particular of the battery, for example, the high-voltage battery, whereas the second coolant-heat exchanger is produced preferably for cooling components of the powertrain of the motor vehicle, such as the electric motor, the internal charging unit, the transformer or the inverter.

It is of special advantage that the first coolant partial circuit is embedded in the coolant circuit via one first branch-off point and one first merging point, whereas the second coolant partial circuit is integrated into the coolant circuit preferably via one second branch-off point and one second merging point. The branch-off points can be produced as three-way valves.

The coolant partial circuits are each connected preferably on the merging point to one first connection of the coolant circuit, and on the branch-off point to one second connection of the coolant circuit in such a way that the first coolant-heat exchanger and the second coolant-heat exchanger are connected to the coolant-air heat exchanger each on their coolant sides. The coolant partial circuits can be operated either commonly as a coolant circuit or independently of each other and fluidically completely separately of each other, wherein each of the coolant partial circuits is assigned one closed partial quantity of the coolant.

The task of the invention is also solved by way of one first method according to the invention for operation of the aforementioned system for air-conditioning the air of a passenger compartment and for heat transfer by way of drive components of a motor vehicle in a heating mode for heating the supply air for the passenger compartment. The method exhibits the following steps:

Transfer of heat from refrigerant, which circulates in the refrigerant circuit at high-pressure level, when flowing through the first refrigerant-air heat exchanger operated as a condenser/gas cooler to the supply air for the passenger compartment, wherein the supply air is heated up to a final temperature;

Subsequent routing of the refrigerant through the first flow path, wherein the refrigerant passes the completely opened second expansion element nearly without pressure losses, and heat is transferred in the third refrigerant-air heat exchanger operated as a condenser/gas cooler to the supply air for the passenger compartment, wherein the supply air is preheated, and Subsequent routing of the refrigerant through the third flow path, wherein the refrigerant is expanded to a low-pressure level when flowing through the fourth expansion element and is evaporated and overheated in the second refrigerant-coolant heat exchanger under absorption of heat from the coolant circulating in the second coolant partial circuit of the coolant circuit, wherein the coolant is cooled down.

When flowing over the third refrigerant-air heat exchanger, the supply air for the passenger compartment is preheated and subsequently heated to the desired outlet temperature when flowing over the first refrigerant-air heat exchanger. The components of the powertrain of the motor vehicle serve as the heat source.

The task of the invention is also solved by way of a second method according to the invention for operation of the aforementioned system for air-conditioning the air in a passenger compartment and for heat transfer by way of drive components of a motor vehicle in a heating mode for heating the supply air for the passenger compartment. The method exhibits the following steps:

Transfer of heat from refrigerant, which circulates in the refrigerant circuit at a high-pressure level, when flowing through the first refrigerant-air heat exchanger operated as a condenser/gas cooler to the supply air for the passenger compartment, wherein the supply air is heated up to a final temperature;

Expansion of the refrigerant to a medium-pressure level or to the low-pressure level when flowing through the first expansion element, and transfer of heat from the ambient air to the refrigerant when flowing through the second refrigerant-air heat exchanger operated as an evaporator, wherein quantity of the heat absorbed from the ambient air is regulated by way of the medium-pressure level, and Subsequent routing of the refrigerant through the third flow path, wherein the refrigerant is expanded from the medium-pressure level to the low-pressure level when flowing through the fourth expansion element or the fourth expansion element is fully opened and the refrigerant is evaporated and overheated in the second refrigerant-coolant heat exchanger under absorption of heat from a coolant circulating in the second coolant partial circuit of the coolant circuit, wherein the coolant is cooled down.

The ambient air and the components of the powertrain of the motor vehicle serve as the heat source.

According to a further embodiment of the invention, the refrigerant on the suction side of the refrigerant circuit is divided into one first partial mass flow through the third flow path and one second partial mass flow through one fourth flow path when the refrigerant is expanded to low-pressure level when flowing through the first expansion element. The partial mass flows of the refrigerant are mixed on a merging point and sucked in by the compressor.

The task of the invention is also solved by way of a second method according to the invention for operation of the aforementioned system for air-conditioning the air in a passenger compartment and for heat transfer by way of drive components of a motor vehicle in a mode for heating one drive component, in particular the battery. The method exhibits the following steps:

Routing of the refrigerant circulating in the refrigerant circuit at a high-pressure level through the second flow path, wherein the refrigerant passes the completely opened third expansion element, and heat is transferred to the coolant circulating in the first coolant partial circuit in the first refrigerant-coolant heat exchanger operated as a condenser/gas cooler, wherein the coolant is heated, and the heated coolant is fed to the drive component to be heated, and Subsequent routing of the refrigerant through the third flow path, wherein the refrigerant is expanded to a low-pressure level when flowing through the fourth expansion element and is evaporated and overheated in the second refrigerant-coolant heat exchanger under absorption of heat from the coolant circulating in the second coolant partial circuit of the coolant circuit, wherein the coolant is cooled down.

The cooled-down coolant is preferably fed to at least one component of the powertrain, and the component is cooled.

The advantageous embodiment of the invention allows use of the system in motor vehicles with an electric motor drive or a hybrid drive consisting of an electric motor and a combustion engine.

The system according to the invention with integrated heat pump functionality, in particular for pure electrically driven or hybrid electric vehicles (HEV) with combustion engine, in summary exhibits various advantages:

- It meets all requirements with reference to the heat management of an electric vehicle in a very wide range of the ambient temperature by air-conditioning the air of a passenger compartment by way of cooling, dehumidifying and heating, as well as maintaining the temperature, in particular cooling or heating the battery and cooling of components of the powertrain.
- High degree of waste heat recovery, with energy-efficient heating of the supply air for the passenger compartment by using waste heat from the refrigerant circuit, and recovery of the heat from components of the electric powertrain, with
- Maximum efficiency in operation with high degree of using the waste heat with high flexibility and functionality;
- Compact design with low complexity, both on the refrigerant side and on the air side;
- Low costs during manufacturing, maintenance and during operation.

The system, in particular the refrigerant circuit, is independent of the refrigerant and thus also designed for R134a, R744, R1234yf, R290 or other refrigerants.

BRIEF DESCRIPTION OF DRAWINGS

Further details, features, and advantages of embodiments of the invention result from the following description of examples of embodiment with reference to the corresponding drawings. The illustrations show the following.

DESCRIPTION OF AN EMBODIMENT

Figure 1:
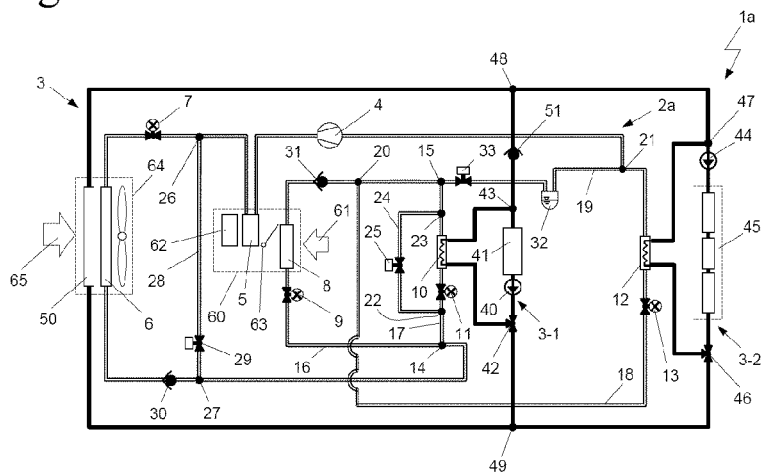
FIG. 1: One first system for air-conditioning the air of a passenger compartment and for heat transfer by way of drive components of a motor vehicle with one refrigerant circuit and one coolant circuit that exhibits two coolant partial circuits thermally coupled with the refrigerant circuit.

FIG. 1 shows one first system 1a for air-conditioning the air of a passenger compartment and for heat transfer by way of the drive components of a motor vehicle with one refrigerant circuit 2a and one coolant circuit 3 which exhibits two coolant partial circuits 3-1, 3-2 that are thermally coupled with the refrigerant circuit 2a.

The refrigerant circuit 2a exhibits one compressor 4 in the flow direction of the refrigerant for sucking in and compressing the refrigerant, one first refrigerant-air heat exchanger 5 which is operated as a condenser/gas cooler and serves for heating of the supply air for the passenger compartment, and one second refrigerant-air heat exchanger 6 for heat transfer by way of the ambient air, with one upstream first expansion element 7, in particular an expansion valve.

Furthermore, the refrigerant circuit 2a is produced with one third refrigerant-air heat exchanger 8 for heat transfer with the supply air for the passenger compartment and one upstream second expansion element 9, which are arranged together in one first flow path 16, one first refrigerant-coolant heat exchanger 10 used to maintain the correct temperature for the battery, and one upstream third expansion element 11, which are arranged together in one second flow path 17, as well as one second refrigerant-coolant heat exchanger 12 for cooling the components of the powertrain, in particular of the electric powertrain, and one upstream fourth expansion element 13, which are arranged together in one third flow path 18.

The first flow path 16 and the second flow path 17 each extend from one first branch-off point 14 to one first merging point 15 and can be flowed through by refrigerant either separately or commonly and simultaneously, as required.

After flowing out of the second refrigerant-air heat exchanger 6 for heat transfer by way of the ambient air, the refrigerant mass flow can be divided at the first branch-off point 14 into two partial mass flows. The percentages of the partial mass flows can range from 0 to 100%, as required.

One fourth flow path 19 extends from one second branch-off point 20, that is arranged preferably in the first flow path 16, to a second merging point 21, wherein the second branch-off point 20 can also be produced together with the first merging point 15 of the first flow path 16 and of the second flow path 17.

Due to the fact that the third flow path 18 with the second refrigerant-coolant heat exchanger 12 and the upstream expansion element 13 extends from the second branch-off point 20 to the second merging point 21, the refrigerant mass flow can be divided, in turn, at the second branch-off point 20 into two partial mass flows. The percentages of the partial mass flows can range from 0 to 100%, as required.

With formation of the additional second refrigerant-coolant heat exchanger 12, high heat absorption power of the refrigerant circuit 2a is achieved.

The refrigerant is sucked in by the compressor 4 at the second merging point 21. The refrigerant circuit 2a is closed.

In addition, the second flow path 17 exhibits one third branch-off point 22 and one third merging point 23, with one first bypass flow path 24 extending between them around the first refrigerant-coolant heat exchanger 10 with the upstream third expansion element 11. Consequently, the third branch-off point 22 is produced between the first branch-off point 14 and the third expansion element 11, whereas the third merging point 23 is arranged between the first refrigerant-coolant heat exchanger 10 and the first merging point 15 and the second branch-off point 20, respectively. The first bypass flow path 24 is produced with one first shut-off valve 25.

With the use of the first bypass flow path 24, which is arranged around the first refrigerant-coolant heat exchanger 10, the refrigerant-side pressure loss on the low-pressure side of the refrigerant circuit 2a can be minimized.

In addition, the refrigerant circuit 2a exhibits one fourth branch-off point 26 and one fourth merging point 27, between them one second bypass flow path 28 extends around the second refrigerant-air heat exchanger 6 for heat transfer by way of the ambient air, with the upstream first expansion element 7. Consequently, the fourth branch-off point 26 is produced between the first refrigerant-air heat exchanger 5 for heating the supply air for the passenger compartment and the first expansion element 7, whereas the fourth merging point 27 is arranged between the second refrigerant-air heat exchanger 6 and the first branch-off point 14. The second bypass flow path 28 is produced with one second shut-off valve 29.

In order to prevent return flow of the refrigerant mass flow routed through the second bypass flow path 28 into the second refrigerant-air heat exchanger 6, one first non-return device 30, in particular a non-return valve, is intended between the fourth merging point 27 and the second refrigerant-air heat exchanger 6.

Similarly, in order to prevent return flow of the refrigerant mass flow routed through the second flow path 17 into the third refrigerant-air heat exchanger 8 arranged in the first flow path 16, a second non-return device 31, in particular a non-return valve, is arranged between the second branch-off point 20 and the third refrigerant-air heat exchanger 8.

The fourth flow path 19 exhibits one accumulator 32 and one third shut-off valve 33.

The third flow path 18 starting from the second branch-off point 20 and extending to the second merging point 21, with the second refrigerant-coolant heat exchanger 12, as well as the fourth flow path 19 with the accumulator 32 can be supplied with refrigerant simultaneously.

The system 1a is configured such that the third refrigerant-air heat exchanger 8 and the first refrigerant-coolant heat exchanger 10, also referred to as chiller, in particular battery chiller, can be operated both on the low-pressure side as an evaporator and on the high-pressure side of the refrigerant circuit 2a as a condenser/gas cooler, depending on the requirements or on the operating mode, so that the third refrigerant-air heat exchanger 8 can be operated as an air-cooled condenser/gas cooler for heating the supply air for the passenger compartment, and the first refrigerant-coolant heat exchanger 10 as a coolant-cooled condenser/gas cooler for heating the battery. The alternative operation of the heat exchangers 8, 10 on the high-pressure side and on the low-pressure side of the refrigerant circuit 2a maximizes the flexibility of use of the system 1a and results in a large number of operating modes, compared to conventional systems.

The expansion elements 7, 9, 11, 13 that are configured preferably as expansion valves are produced in such a way that they close completely as required so that switching between the operating modes, in particular between a heating mode and a refrigeration system mode, can be performed steplessly and without switching off the compressor 4. Formation of the refrigerant circuit 2a with reversal of the flow direction of the refrigerant through the second refrigerant-air heat exchanger 6 is not necessary, which inter alia results in a simplified oil management, since oil traps and refrigerant traps in the refrigerant circuit 2a are avoided.

The first refrigerant-coolant heat exchanger 10 establishes a thermal connection to the first coolant partial circuit 3-1 of the coolant circuit 3. The first coolant partial circuit 3-1 exhibits one first feeding device 40, in particular a pump or a coolant pump, which feeds the coolant through the first coolant partial circuit 3-1, for example, with the first refrigerant-coolant heat exchanger 10 and one first coolant-heat exchanger 41. The first coolant-heat exchanger 41 is produced especially to maintain the temperature for a battery, for example, a high-voltage battery.

The first coolant partial circuit 3-1 serves, in particular in case of high temperature values of the ambient air, for cooling the battery and maintaining the temperature of the battery below a specified limit value.

The first coolant partial circuit 3-1 is integrated into the coolant circuit 3 via one first branch-off point 42 and one first merging point 43, wherein the first feeding device 40 and the first coolant-heat exchanger 41 on the one hand, and the first refrigerant-coolant heat exchanger 10 on the other hand, are arranged between the first branch-off point 42 and the first merging point 43 of the coolant circuit 3. The first branch-off point 42 is produced as a three-way valve.

The second refrigerant-coolant heat exchanger 12 establishes a thermal connection to the second coolant partial circuit 3-2 of the coolant circuit 3. The second coolant partial circuit 3-2 exhibits one second feeding device 44, in particular a pump or a coolant pump, which feeds the coolant through the second coolant partial circuit 3-2, for example, with the second refrigerant-coolant heat exchanger 12 and one second coolant-heat exchanger 45. The second coolant-heat exchanger 45 is produced especially for the cooling of components of the powertrain of the motor vehicle, in particular the electrical powertrain, such as an electric motor, an internal charging unit, a transformer or an inverter.

The second coolant partial circuit 3-2 is integrated into the coolant circuit 3 via one second branch-off point 46 and one second merging point 47, wherein the second feeding device 44 and the second coolant-heat exchanger 45 on the one hand, and the second refrigerant-coolant heat exchanger 12 on the other hand, are arranged between the second branch-off point 46 and the second merging point 47 of the coolant circuit 3. The second branch-off point 46 is produced as a three-way valve.

The second coolant partial circuit 3-2, also referred to as cold-water set, can be used for recovery of waste heat from components of the powertrain, in particular the electric powertrain, wherein the heat is transferred as vaporization heat to the refrigerant circulating in the refrigerant circuit 2a. In this way, in addition to the possible heating power, the efficiency of the system 1a is maximized.

Especially for operation in a heating mode, the formation of the system 1a with the second coolant partial circuit 3-2 allows to accumulate the waste heat produced by the drive components, in particular the electric drive components, and to make available to the refrigerant in the second refrigerant-coolant heat exchanger 12 as vaporization heat. Such a waste heat recovery contributes to improving the entire energy efficiency and heat efficiency of the motor vehicle. The heat that otherwise would have to be balanced as thermal loss power is absorbed by the system 1a as vaporization heat, which maximizes the power and efficiency of the system 1a when operated in heating mode.

In an undercritical mode of the refrigerant circuit 2a with the refrigerants R134a, R1234yf or R290, for example, operated in a heating mode or reheating mode, the efficiency and the power of the system 1a, are improved, in particular with reference to the formation of the refrigerant circuit with a circular-internal heat exchanger, as shown in particular in the following figures.

On the one hand, the coolant partial circuits 3-1, 3-2 of the coolant circuit 3 can be operated independently of each other, wherein each of the coolant partial circuits 3-1, 3-2 is assigned one partial quantity of the coolant, which circulates inside one of the coolant partial circuits 3-1, 3-2, depending on the operating mode. The coolant partial circuits 3-1, 3-2 are fluidically completely separated from each other.

On the other hand, the two coolant partial circuits 3-1, 3-2 can be connected to one another via one first connection 48 and one second connection 49 and operated as a common coolant circuit 3. The coolant circuit 3 exhibits one coolant-air heat exchanger 50 for heat transfer by way of the ambient air, wherein both the coolant fed through the first coolant-heat exchanger 41 and the coolant fed through the second coolant-heat exchanger 45 can be routed to the coolant-air heat exchanger 50 in order to dissipate heat absorbed by the battery and/or the components of the powertrain to the ambient air. This operating mode is referred to as passive cooling of the battery by way of the first coolant-heat exchanger 41 or as passive cooling of the components of the powertrain by way of the second coolant-heat exchanger 45. In the case of active cooling, compared to passive cooling, the heat absorbed by the battery is transferred in the first refrigerant-coolant heat exchanger 10 to the refrigerant, or the heat absorbed by the components of the powertrain is transferred in the second refrigerant-coolant heat exchanger 12 to the refrigerant.

The coolant circulating in the coolant circuit 3 can be divided on the first connection 48 that serves as a branch-off point into one first partial mass flow through the first coolant-heat exchanger 41 and one second partial mass flow through the second coolant-heat exchanger 45. The partial mass flows are mixed again on the second connection 49 that serves as the merging point and routed to the coolant-air heat exchanger 50, wherein the percentages of the partial mass flows of the coolant can range from 0 to 100%, as required.

In order to prevent undesired return flow, in particular from the first coolant partial circuit 3-1 into the other components of the coolant circuit 3, a non-return device 51 is intended between the first merging point 43 of the first coolant partial circuit 3-1 and the first connection 48. The non-return device 51 is produced preferably as a non-return valve.

With the use of the second refrigerant-coolant heat exchanger 12, the complexity and the necessity of additional coolant valves inside the coolant circuit 3, which are caused, in particular by connection of all cooling components to one individual heat exchanger, are reduced significantly.

The first refrigerant-air heat exchanger 5 for heating the supply air for the passenger compartment is arranged inside a housing 60 of an air conditioning unit for conditioning the supply air, together with the third refrigerant-air heat exchanger 8, wherein the third refrigerant-air heat exchanger 8 of the refrigerant circuit 2a, which can be operated as an evaporator or as a condenser/gas cooler, is arranged in the flow direction 61 of the supply air upstream of the first refrigerant-air heat exchanger 5 for heating the supply air for the passenger compartment so that, for example, the supply air for the passenger compartment is heated inside the system 1a that is operated in a heating mode, or the dehumified and/or cooled-down supply air for the passenger compartment when flowing through the third refrigerant-air heat exchanger 8 operated as an evaporator of the refrigerant can be reheated inside the system 1a that is operated in a reheating mode.

To be able to heat the supplied air, an additional thermal-heat heat exchanger 62 can be intended inside the housing 60 of the air conditioning unit. The thermal-heat heat exchanger 62 which can be operated as an option can be produced as an electrical PTC heater for heating the supply air flowing into the passenger compartment and, in particular as a high-voltage PTC heater, provides for a higher and adapted heating power and dynamics on the air side. The thermal-heat heat exchanger 62 is arranged in the flow direction 61 of the supply air downstream of the first refrigerant-air heat exchanger 5 of the refrigerant circuit 2a.

The supply air for the passenger compartment can be divided by way of a flow guiding device 63 arranged in the housing 60 and in the flow direction 61 of the supply air between the third refrigerant-air heat exchanger 8 and the first refrigerant-air heat exchanger 5 of the refrigerant circuit 2a in such a way into partial mass flows that one first partial mass flow is routed to the first refrigerant-air heat exchanger 5 or to the additional thermal-heat heat exchanger 62, and one second partial mass flow in a bypass is routed around the first refrigerant-air heat exchanger 5 or the additional thermal-heat heat exchanger 62. The percentages of the partial mass flows can range from 0 to 100%, as required.

The coolant-air heat exchangers 50 of the coolant circuit 3, which are produced for heat transfer by way of the ambient air, and one second refrigerant-air heat exchanger 6 of the refrigerant circuit 2a are arranged inside a housing 64 in the specified order in the flow direction 65 of the ambient air in the front area of a body of the motor vehicle.

The coolant-air heat exchanger 50 of the coolant circuit 3 is flowed upon by the ambient air as the first heat exchanger. Alternatively, the heat exchangers 6, 50 can be supplied with ambient air simultaneously with each other.

Figure 2:
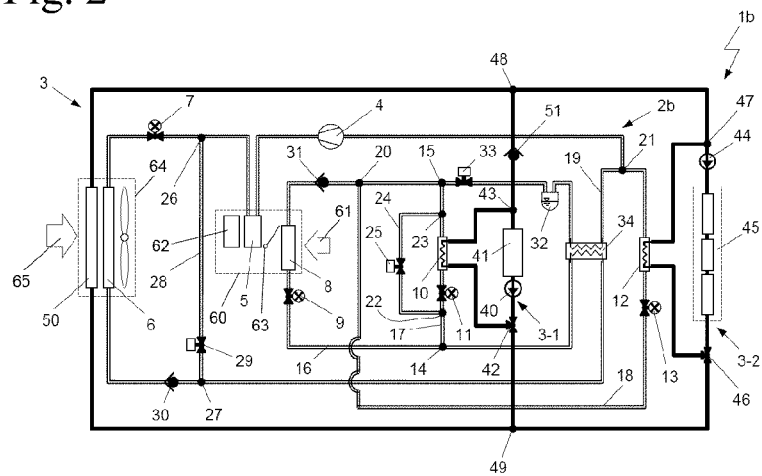
FIG. 2: One second system for air-conditioning the air of a passenger compartment and for heat transfer by way of drive components of a motor vehicle, similar to the system shown in FIG. 1, with one circular-internal heat exchanger.

FIG. 2 shows a further system 1b for air-conditioning the air of the passenger compartment and for heat transfer by way of drive components of the motor vehicle with one refrigerant circuit 2b and the coolant circuit 3 which exhibits two coolant partial circuits 3-1, 3-2 that are thermally coupled with the refrigerant circuit 2b. The system 1b in accordance with FIG. 2 differs from the system 1a that is shown in FIG. 1 exclusively in the formation of a circular-internal heat exchanger 34. The other components of the systems 1a, 1b, in particular of the refrigerant circuits 2a, 2b and the coolant circuit 3, are identical so that reference is made to the explanations regarding the system 1a according to FIG. 1, as far as their embodiment and arrangement are concerned.

On the one hand, the circular-internal heat exchanger 34 of the refrigerant circuit 2b is arranged between the second refrigerant-air heat exchanger 6 for heat transfer by way of the ambient air, in particular downstream of the fourth merging point 27 in the flow direction of the refrigerant, and the first branch-off point 14 of the first flow path 16 and the second flow path 17. This area of the refrigerant circuit 2b can be supplied with refrigerant at high-pressure level.

On the other hand, the circular-internal heat exchanger 34 of the refrigerant circuit 2b is intended inside the fourth flow path 19, which extends between the second branch-off point 20 or the first merging point 15 and the second merging point 21 and is arranged downstream of the accumulator 32 in the flow direction of the refrigerant. The refrigerant in this area of the refrigerant circuit 2b always exhibits low-pressure level and is sucked in by the compressor 4.

Figure 3:
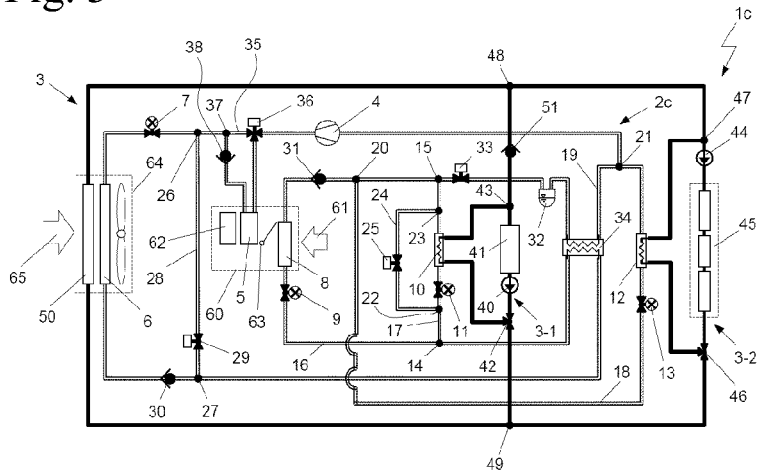
FIG. 3: One third system for air-conditioning the air of a passenger compartment and for heat transfer by way of drive components of the motor vehicle of a motor vehicle, similar to the system shown in FIG. 2, with one additional bypass flow path around one first refrigerant-air heat exchanger.

FIG. 3 shows a further alternative system 1c for air-conditioning the air of the passenger compartment and for heat transfer by way of drive components of the motor vehicle with one refrigerant circuit 2c and the coolant circuit 3 which exhibits two coolant partial circuits 3-1, 3-2 that are thermally coupled with the refrigerant circuit 2c. The alternative system 1c differs from the system 1b shown in FIG. 2 exclusively in one additional third bypass flow path 35 around the first refrigerant-air heat exchanger 5 for heating the supply air of the passenger compartment. Since the other components of the systems 1b, 1c, in particular of the refrigerant circuits 2b, 2c and of the coolant circuit 3 are identical, reference is made to the explanations regarding the system 1b shown in FIG. 2 or to the explanations regarding the system 1a shown in FIG. 1.

The third bypass flow path 35 of the refrigerant circuit 2c extends from one fifth branch-off point 36 up to one fifth merging point 37, wherein the fifth branch-off point 36 is arranged between the compressor 4 and the first refrigerant-air heat exchanger 5 and produced preferably as a three-way valve. The fifth merging point 37 is intended between the refrigerant-air heat exchanger 5 and the first expansion element 7 which is arranged upstream of the second refrigerant-air heat exchanger 6, in particular in the flow direction of the refrigerant upstream of the fourth branch-off point 26 of the second bypass flow path 28.

In order to prevent return flow of the refrigerant mass flow routed through the third bypass flow path 35 into the first refrigerant-air heat exchanger 5, one third non-return device 38, in particular a non-return valve, is intended between the first refrigerant-air heat exchanger 5 and the fifth merging point 37.

In the following, the system 1b as shown in FIG. 2 is shown in different operating modes, in particular the refrigerant circuit 2b in a refrigeration system mode, a reheating mode or a heating mode referred to the supply air for the passenger compartment, and with active or passive cooling of the battery and of the components of the powertrain, in particular the electric powertrain. Passive cooling in this context is to be understood as cooling by way of coolant circulating in the coolant circuit 3, with output of heat by the coolant to the ambient air. In the case of active cooling, the heat transferred to the coolant is emitted to the refrigerant circulating in the refrigerant circuit 2b.

The connecting pipes of the refrigerant circuit 2b and of the coolant circuit 3 which are flowed through by refrigerant or coolant are each highlighted by way of solid lines, whereas the connecting pipes not supplied with refrigerant or coolant are highlighted by way of dotted lines.

Figure 4A:
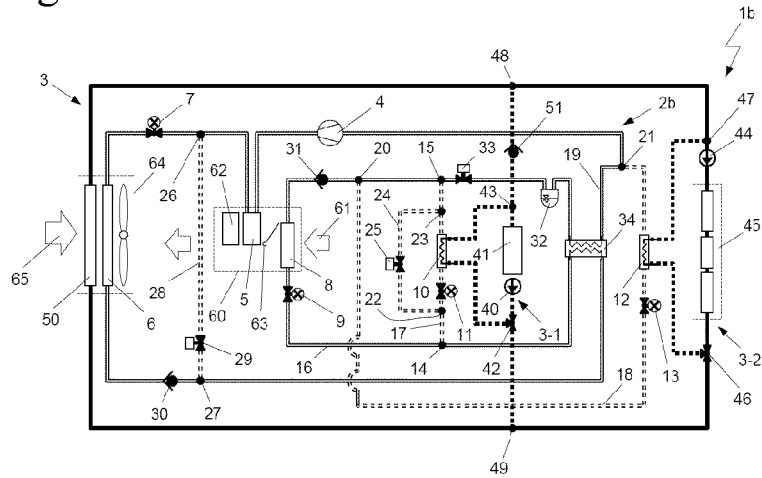
FIG. 4A: The second system according to FIG. 2 during operation of the refrigerant circuit in refrigeration system mode, and of the coolant circuit with passive cooling of the components of the powertrain, in particular of the electric powertrain.

During operation of the refrigerant circuit 2b of the system 1b according to FIG. 2 in a refrigeration system mode and of the coolant circuit 3 with passive cooling of the components of the powertrain, in particular the electric powertrain in accordance with FIG. 4A, the heat transferred in the third refrigerant-air heat exchanger 8 by the supply air for the passenger compartment to the refrigerant is transferred in the second refrigerant-air heat exchanger 6 by the refrigerant to the ambient air.

The high-pressure refrigerant flowing out of the compressor 4 is cooled down or desuperheated and liquified, as well as supercooled, as necessary, in the second refrigerant-air heat exchanger 6 operated as a condenser/gas cooler. Subsequently, the refrigerant is routed through the circular-internal heat exchanger 34 and cooled down further.

The first expansion element 7 arranged between the first refrigerant-air heat exchanger 5 and the second refrigerant-air heat exchanger 6 is fully opened so that the two heat exchangers 5, 6 are flowed through by refrigerant at like pressure level, in particular the high-pressure level. The refrigerant passes the expansion element 7 nearly without pressure losses.

The flow guiding device 63 arranged inside the housing 60 is set in such a way that the supply air flowing through the housing 60 bypasses the first refrigerant-air heat exchanger 5. The first refrigerant-air heat exchanger 5 is not supplied with the supply air for the passenger compartment so that no heat is transferred in the first refrigerant-air heat exchanger 5.

Furthermore, compared to the system 1b, in the case of the system 1c according to FIG. 3, it is possible to route the refrigerant through the third bypass flow path 35 of the refrigerant circuit 2c directly to the second refrigerant-air heat exchanger 6 bypassing the first refrigerant-air heat exchanger 5 so that the first refrigerant-air heat exchanger 5 is not supplied with refrigerant, resulting in avoiding a pressure drop on the high-pressure side of the refrigerant circuit 2c which could be produced when the refrigerant flows through the first refrigerant-air heat exchanger 5.

At the first branch-off point 14, the refrigerant is routed into the first flow path 16 to the second expansion element 9 and expanded to the low-pressure level when flowing through the second expansion element 9. In the third refrigerant-air heat exchanger 8 which is operated as an evaporator, the refrigerant is evaporated and, as necessary, overheated under absorption of heat from the supply air for the passenger compartment, wherein the supply air is cooled down and/or dehumidified. Subsequently, when flowing through the low-pressure side of the circular-internal heat exchanger 34, the refrigerant is heated or overheated further and sucked in by the compressor 4. In the circular-internal heat exchanger 34, heat is transferred by the refrigerant at high-pressure level to the refrigerant at low-pressure level.

Both the second flow path 17 and the third flow path 18, as well as the second bypass flow path 28 around the second refrigerant-air heat exchanger 6 are closed and are all not supplied with refrigerant, wherein in particular, the third expansion element 11 and the first shut-off valve 25, as well as the fourth expansion element 13 and the second shut-off valve 29 are fully closed.

The coolant is circulated by way of the second feeding device 44 which is arranged between the second coolant-heat exchanger 45 of the drive components and the coolant-air heat exchanger 50. The heat transferred by the drive components in the second coolant-heat exchanger 45 to the coolant circulating in the coolant circuit 3 is transferred by the coolant in the coolant-air heat exchanger 50 to the ambient air. The first coolant-heat exchanger 41 is not flowed through by coolant.

The ambient air is sucked in into the housing 64 in the flow direction 65, preferably by way of a blower, and then fed to the coolant-air heat exchanger 50 for absorption of the heat from the coolant and then further to the second refrigerant-air heat exchanger 6 for absorption of the heat from the refrigerant.

Figure 4B:
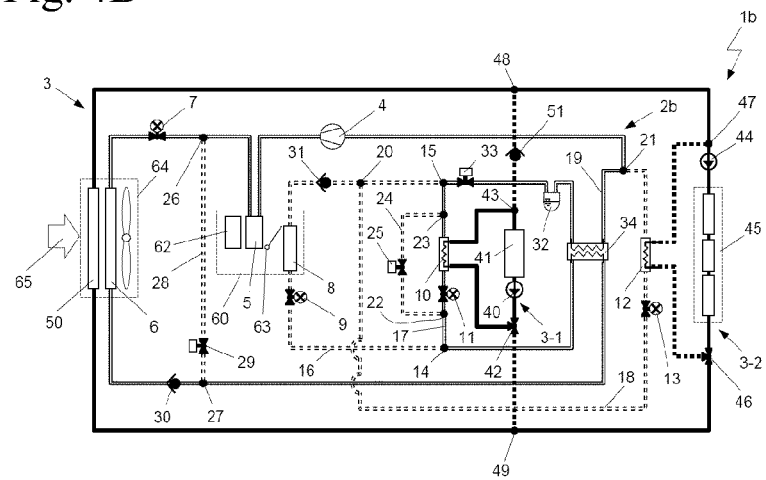
FIG. 4B: The second system according to FIG. 2 during operation of the refrigerant circuit with active cooling of the battery and of the coolant circuit with passive cooling of the components of the powertrain, in particular of the electric powertrain.

FIG. 4B shows the system 1b according to FIG. 2 during operation of the refrigerant circuit 2b with active cooling of the battery and of the coolant circuit 3 with passive cooling of the components of the powertrain, in particular of the electric powertrain.

A first difference compared to the operating mode of the system 1b according to FIG. 4A lies in the operation of the first feeding device 40 of the first coolant partial circuit 3-1 and thus of the active cooling of the battery. The coolant is circulated in the first coolant partial circuit 3-1 between the first refrigerant-coolant heat exchanger 10 and the first coolant-heat exchanger 41, wherein the heat dissipated by the battery in the first coolant-heat exchanger 41 is transferred in the first refrigerant-coolant heat exchanger 10 to the refrigerant circulating in the refrigerant circuit 2b. The first coolant partial circuit 3-1 is operated separately from the mode described in the operating mode according to FIG. 4A, wherein the partial quantities of the coolant circulating in the first coolant partial circuit 3-1 and in the other coolant circuit 3 are not mixed with each other.

A further difference compared to the operating mode of the system 1b, in particular of the refrigerant circuit 2b, which is shown in FIG. 4A, is that the refrigerant at the first branch-off point 14 is routed exclusively into the second flow path 17 to the third expansion element 11 and is expanded to the low-pressure level when flowing through the third expansion element 11. In the first refrigerant-coolant heat exchanger 10, the refrigerant is evaporated and, if necessary, overheated under absorption of heat from the coolant circulating in the first coolant partial circuit 3-1, wherein the coolant is cooled down. Subsequently, when flowing through the low-pressure side of the circular-internal heat exchanger 34, the refrigerant is heated or overheated further and sucked in by the compressor 4.

Both the first flow path 16 and the first bypass flow path 24 of the second flow path 17, as well as the third flow path 18 and the second bypass flow path 28 around the second refrigerant-air heat exchanger 6 are closed and are all not supplied with refrigerant, wherein in particular, the second expansion element 9 and the first shut-off valve 25, as well as the fourth expansion element 13 and the second shut-off valve 29 are fully closed.

Figure 4C:
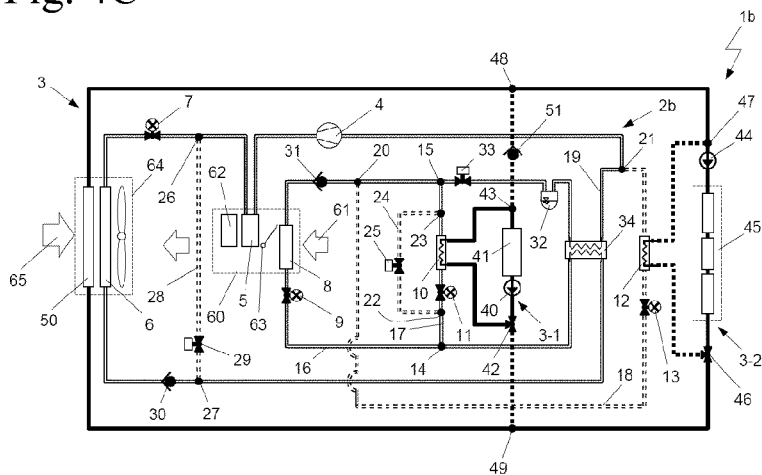
FIG. 4C: The second system according to FIG. 2 during operation of the refrigerant circuit in refrigerant system mode with active cooling of the battery and of the coolant circuit with passive cooling of the components of the powertrain, in particular of the electric powertrain.

During operation of the refrigerant circuit 2b of the system 1b in a refrigerant system mode with active cooling of the battery and of the coolant circuit 3 with passive cooling of the components of the powertrain, in particular the electric powertrain, in accordance with FIG. 4C, the heat transferred by the supply air for the passenger compartment in the third refrigerant-air heat exchanger 8 to the refrigerant circulating in the refrigerant circuit 2b and the heat transferred by the battery to the coolant in the first coolant-heat exchanger 41 and by the coolant in the first refrigerant-coolant heat exchanger 10 to the refrigerant circulating in the refrigerant circuit 2a is transferred by the refrigerant in the second refrigerant-air heat exchanger 6 to the ambient air.

In contrast to the operating mode of the system 1b, in particular of the refrigerant circuit 2b, in accordance with FIG. 4B, the refrigerant is divided at the first branch-off point 14 into two partial mass flows—one first partial mass flow through the first flow path 16 and one second partial mass flow through the second flow path 17.

The refrigerant of the first partial mass flow which is routed into the first flow path 16 is routed to the second expansion element 9 and expanded to the low-pressure level when flowing through the second expansion element 9. In the third refrigerant-air heat exchanger 8 operated as an evaporator, the refrigerant is evaporated and, if necessary, overheated under absorption of heat from the supply air for the passenger compartment, wherein the supply air is cooled down and/or dehumidified.

The refrigerant of the second partial mass flow that is routed into the second flow path 17 is routed to the third expansion element 11 and expanded to the low-pressure level when flowing through the third expansion element 11. In the first refrigerant-coolant heat exchanger 10, the refrigerant is evaporated and, if necessary, overheated under absorption of heat from the coolant circulating in the first coolant partial circuit 3-1, wherein the coolant is cooled down.

Subsequently, the partial mass flows of the refrigerant are mixed with each other at the first merging point 15 and, when flowing through the low-pressure side of the circular-internal heat exchanger 34, heated further or overheated and sucked in by the compressor 4.

Both the first bypass flow path 24 of the second flow path 17, as well as the third flow path 18 and the second bypass flow path 28 around the second refrigerant-air heat exchanger 6 are closed and are all not supplied with refrigerant, wherein, in particular the first shut-off valve 25 and the fourth expansion valve 13, as well as the second shut-off valve 29 are fully closed.

Figure 5A:
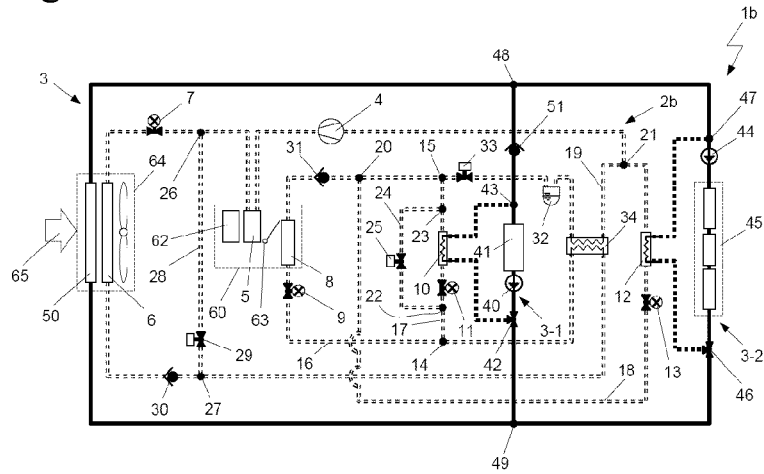
FIG. 5A: The second system according to FIG. 2 during operation of the coolant circuit with passive cooling of the battery and of the components of the powertrain, in particular of the electric powertrain.
Figure 5B:
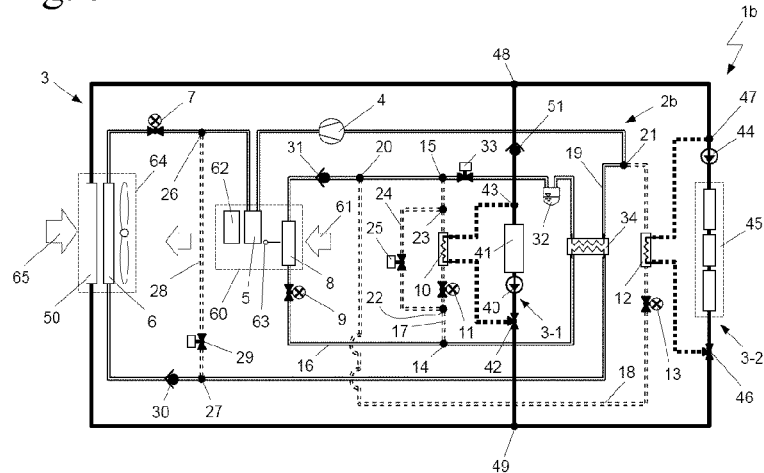
FIG. 5B: The second system according to FIG. 2 during operation of the refrigerant circuit in reheating mode and of the coolant circuit with passive cooling of the battery and of the components of the powertrain, in particular of the electric powertrain.
Figure 5C:
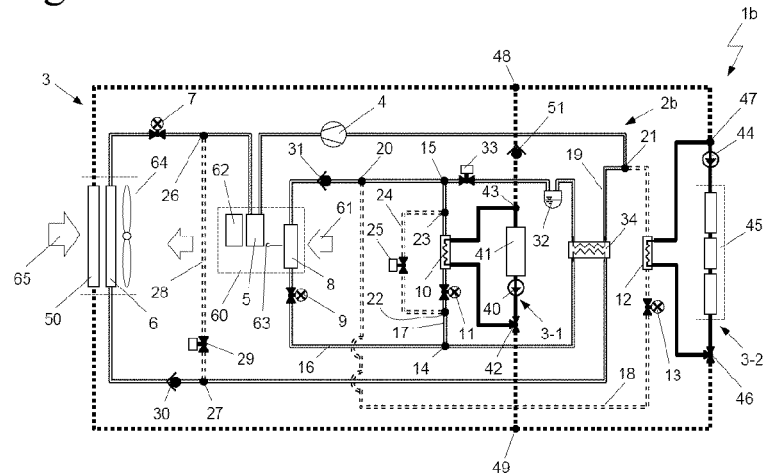
FIG. 5C: The second system according to FIG. 2 during operation of the refrigerant circuit in reheating mode with active cooling of the battery and of the components of the powertrain, in particular of the electric powertrain.

The FIGS. 5A to 5C each show the system 1b in accordance with FIG. 2 during operation in a reheating mode, whereas the FIGS. 6A to 6D each show the system 1b in accordance with FIG. 2 during operation in a heating mode.

During operation of the system 1b in a heating mode or a reheating mode, both the waste heat from the air conditioning system, in particular the heat in the third refrigerant-air heat exchanger 8 transferred by the supply air for the passenger compartment to the refrigerant circulating in the refrigerant circuit 2b or the heat transferred by the battery or at least one other component of the powertrain, in particular the electric powertrain, to the refrigerant circulating in the refrigerant circuit 2b and the heat transferred by the ambient air to the refrigerant circulating in the refrigerant circuit 2b can be used for heating the supply air supplied for the passenger compartment. The battery, and the at least one other component of the powertrain, as well as the ambient air can serve as heat sources.

FIG. 5A shows the second system in accordance with FIG. 2 during operation of the coolant circuit 3 with passive cooling of both the battery and the components of the powertrain, in particular the electric powertrain. The compressor 4 of the refrigerant circuit 2b is not operating.

The coolant is fed through the first coolant-heat exchanger 41 by way of the first feeding device 40 to cool the battery and through the second coolant-heat exchanger 45 by way of the second feeding device 44 to cool the drive components, each to the coolant heat exchanger 50. After flowing out of the coolant-air heat exchanger 50, the coolant is divided on the first connection 48, which serves as a branch-off point, into one first partial mass flow through the first coolant-heat exchanger 41 and one second partial mass flow through the second coolant-heat exchanger 45. The partial mass flows are mixed on the second connection 49, which serves as the merging point, and subsequently routed to the coolant-air heat exchanger 50. The appropriate coolant mass flow through the parallel flow paths or its distribution over the parallel flow paths is regulated by way of the feeding devices 40, 44.

The heat transferred by the battery and the drive components to the coolant circulating in the coolant circuit 3 is transferred by the coolant in the coolant-air heat exchanger 50 to the ambient air.

The feeding devices 40, 44 of the coolant circuit 3 can also be operated independently of each other so that the first coolant-heat exchanger 41 for cooling the battery and the second coolant-heat exchanger 45 for cooling the drive components are supplied with coolant independently of each other and both the battery and the drive components are cooled passively and independently of each other.

FIG. 5B shows the operation of the refrigerant circuit 2*b* in reheating mode and of the coolant circuit 3 with passive cooling of both the battery and the components of the powertrain, in particular of the electric powertrain of the system 1*b*.

In contrast to the system 1*b* in accordance with FIG. 5A, the compressor 4 of the refrigerant circuit 2*b* is operating. The high-pressure refrigerant flowing out of the compressor 4 is desuperheated and, if necessary, liquified and possibly supercooled in the first refrigerant-air heat exchanger 5 which is operated as a condenser/gas cooler. The flow guidance device 63 that is arranged inside the housing 60 is set in such a way that the supply air flowing through the housing 60 is routed into one first partial air flow to the first refrigerant-air heat exchanger 5 and one second partial air flow around the first refrigerant-air heat exchanger 5. The first refrigerant-air heat exchanger 5 is consequently only supplied with a part of the supply air for the passenger compartment which was previously cooled down and/or dehumidified. The supply air for the passenger compartment is heated to a desired temperature, wherein the heat transferred to the supply air is regulated via the position of the flow guiding device 63.

Furthermore, compared to the system 1*b*, the system 1*c* as shown in FIG. 3, provides the possibility to divide the refrigerant at the fifth branch-off point 36 into one first partial mass flow through the first refrigerant-air heat exchanger 5 and one second partial mass flow through the third bypass flow path 35, wherein the second partial mass flow of the refrigerant is routed in such a way that it bypasses the first refrigerant-air heat exchanger 5. The partial mass flows of the refrigerant are mixed again with each other at the fifth merging point 37.

Subsequently, the refrigerant is further cooled down or liquified and, if necessary, supercooled when flowing through the second refrigerant-air heat exchanger operated as a condenser/gas cooler. The first expansion element 7 arranged between the first refrigerant-air heat exchanger 5 and the second refrigerant-air heat exchanger 6 is fully opened so that the two heat exchangers 5, 6 are flowed through by refrigerant at like pressure level, in particular the high-pressure level. The refrigerant passes the expansion element 7 nearly without pressure losses.

In particular, in the case of mild temperature of the ambient air, the first expansion element 7 can be set in such a way that the refrigerant is expanded to a medium-pressure level between the high-pressure level and the low-pressure level to be able to regulate the quantity of the heat to be dissipated to the ambient air.

Subsequently, the refrigerant is routed through the circular-internal heat exchanger 34 and cooled down further.

At the first branch-off point 14, the refrigerant is routed into the first flow path 16 to the second expansion element 9 and expanded to the low-pressure level when flowing through the second expansion element 9. In the third refrigerant-air heat exchanger 8 operated as an evaporator, the refrigerant is evaporated and, if necessary, overheated under absorption of heat from the supply air for the passenger compartment, wherein the supply air is cooled down and/or dehumidified. Subsequently, when flowing through the low-pressure side of the circular-internal heat exchanger 34, the refrigerant is heated further or overheated and sucked in by the compressor 4.

Both the second flow path 17 and the third flow path 18, as well as the second bypass flow path 28 around the second refrigerant-air heat exchanger 6 are closed and are all not supplied with refrigerant, wherein in particular, the third expansion element 11 and the first shut-off valve 25, as well as the fourth expansion element 13 and the second shut-off valve 29 are fully closed.

The ambient air is sucked in into the housing 64 in the flow direction 65, preferably by way of a blower, and then fed to the coolant-air heat exchanger 50 for absorption of heat from the coolant and then further to the second refrigerant-air heat exchanger 6 for absorption of the heat from the refrigerant.

Depending on the temperature of the ambient air, during operation in the operating mode as shown in FIG. 5C, it is also possible to cool in particular, the battery also actively via the first coolant partial circuit 3-1 with the first refrigerant-coolant heat exchanger 10 and the first coolant-heat exchanger 41, wherein the heat discharged by the battery is transferred to the refrigerant circulating in the refrigerant circuit 2*b*. The waste heat of the battery can be used as the heat source.

In contrast to the operating mode of the system 1*b*, in particular of the refrigerant circuit 2*b*, in accordance with FIG. 5B, the refrigerant is divided at the first branch-off point 14 into two partial mass flows—one first partial mass flow through the first flow path 16 and one second partial mass flow through the second flow path 17. The refrigerant of the second partial mass flow which is routed into the second flow path 17 is routed to the third expansion element 11 and expanded to the low-pressure level when flowing through the third expansion element 11. In the first refrigerant-coolant heat exchanger 10, the refrigerant is evaporated and, if necessary, overheated under absorption of heat from the coolant circulating in the first coolant partial circuit 3-1, wherein the coolant is cooled down.

Subsequently, the partial mass flows of the refrigerant are mixed with each other at the first merging point 15 and, when flowing through the low-pressure side of the circular-internal heat exchanger 34, heated further or overheated and sucked in by the compressor 4.

Both the first bypass flow path 24 of the second flow path 17, as well as the third flow path 18 and the second bypass flow path 28 around the second refrigerant-air heat exchanger 6 are closed and are all not supplied with refrigerant, wherein in particular, the first shut-off valve 25 and the fourth expansion element 13, as well as the second shut-off valve 29 are fully closed.

In particular, at low temperature of the ambient air, the first expansion element 7 can also be set in such a way that the refrigerant is expanded to a medium-pressure level or the low-pressure level to be able to transfer heat from the ambient air to the refrigerant in the second refrigerant-air heat exchanger 6 that is now operated as an evaporator. With setting of the medium-pressure level, the quantity of the heat absorbed from the ambient air is regulated. The ambient air is used as the heat source.

After flowing out of the second refrigerant-air heat exchanger 6, the refrigerant is routed through the circular-internal heat exchanger 34 and, if necessary, further cooled down.

While the refrigerant is already expanded to the low-pressure level when it flows through the first expansion element 7, then the second expansion element 9 is fully opened so that the refrigerant passes the expansion element 9 nearly without pressure losses. The second refrigerant-air heat exchanger 6 and the third refrigerant-air heat exchanger 8 are supplied with refrigerant at like pressure level, meaning at the low-pressure level.

Figure 6A:
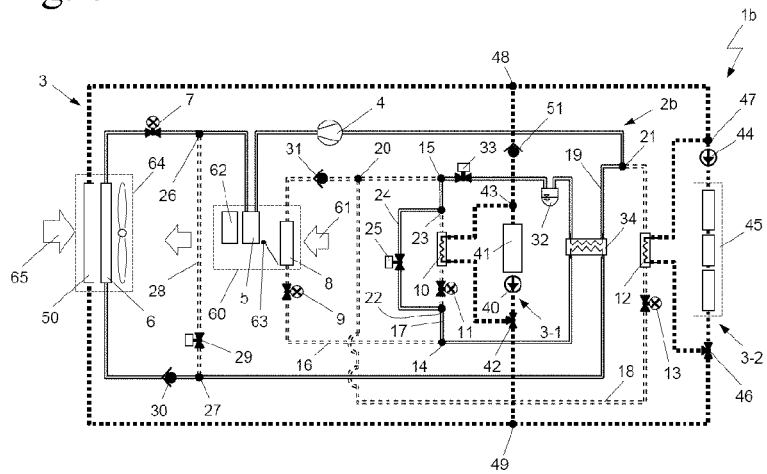
FIG. 6A: The second system according to FIG. 2 during operation of the refrigerant circuit in heating mode with ambient air as the heat source for the refrigerant.

FIG. 6A shows the system 1*b* in accordance with FIG. 2 during operation of the refrigerant circuit 2*b* in a heating mode with ambient air as the heat source for the refrigerant.

The high-pressure refrigerant flowing out of the compressor 4 is desuperheated and liquified, as well as possibly supercooled in the first refrigerant-air heat exchanger 5 operated as a condenser/gas cooler. The flow guiding device 63 arranged inside the housing 60 is set in such a way that the supply air flowing through the housing 60 is routed to the first refrigerant-air heat exchanger 5. Consequently, the first refrigerant-air heat exchanger 5 is supplied preferably with the entire air flow of the supply air for the passenger compartment. The supply air for the passenger compartment is heated to a desired temperature.

When flowing through the first expansion element 7, the refrigerant is expanded to the low-pressure level to be able to absorb heat from the ambient air in the second refrigerant-air heat exchanger 6 operated as an evaporator. The ambient air is used as the heat source for the refrigerant.

At the first branch-off point 14, the refrigerant is routed exclusively into the second flow path 17, and at the third branch-off point 22 into the first bypass flow path 24 and consequently around the first refrigerant-coolant heat exchanger 10 in order to minimize a pressure drop on the low-pressure side or on the suction side of the refrigerant circuit 2*b*. Subsequently, the refrigerant from the compressor 4 is sucked in by the circular-internal heat exchanger 34. Because the temperature level of the refrigerant is nearly identical on both sides of the circular-internal heat exchanger 34, no heat is transferred in the circular-internal heat exchanger 34.

Both the first flow path 16 and the part of the second flow path 17 which exhibits the first refrigerant-coolant heat exchanger 10, as well as the third flow path 18 and the second bypass flow path 28 around the second refrigerant-air heat exchanger 6 are closed and are all not supplied with refrigerant, wherein in particular, the second expansion element 9 and the third expansion element 11, as well as the fourth expansion element 13 and the second shut-off valve 29 are fully closed.

As not shown in FIG. 6A it would also be possible to operate the coolant circuit 3 in parallel to the passive cooling of the battery and/or of the components of the powertrain, in particular the electric powertrain of the system 1*b*.

Figure 6B:
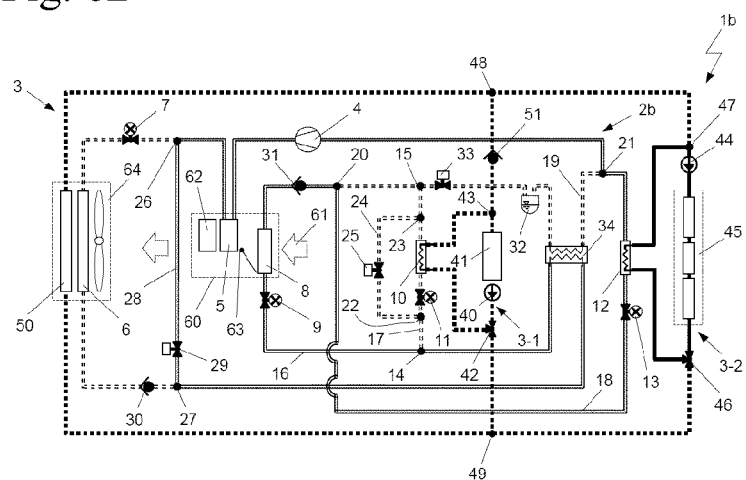
FIG. 6B: The second system according to FIG. 2 during operation of the refrigerant circuit in heating mode with active cooling of the components of the powertrain, in particular of the electric powertrain, and thus as a heat source for the refrigerant.

FIG. 6B shows the system 1*b* according to FIG. 2 during operation of the refrigerant circuit 2*b* in a heating mode with active cooling of the components of the powertrain, in particular the electric powertrain, and thus as a heat source for the refrigerant.

The high-pressure refrigerant flowing out of the compressor 4 is desuperheated and liquified in the first refrigerant-air heat exchanger 5 operated as a condenser/gas cooler. Subsequently, the refrigerant is routed through the second bypass flow path 28 and around the second refrigerant-air heat exchanger 6 to be able to minimize a pressure drop on the high-pressure side of then refrigerant circuit 2*b*.

At the first branch-off point 14, the refrigerant flows exclusively into the first flow path 16 and then to the third refrigerant-air heat exchanger 8 operated as a condenser/gas cooler. The second expansion element 9 is fully opened so that the refrigerant passes the expansion element 9 nearly without pressure losses. The heat exchangers 5, 8 are supplied with refrigerant at like pressure level, in particular the high-pressure level. The refrigerant is liquified further and, if necessary, supercooled in the third refrigerant-air heat exchanger 8.

In this way, the efficiency of the system 1*b* can be increased, compared to systems with refrigerant circuits, merely by way of one condenser/gas cooler.

The flow guiding device 63 arranged inside the housing 60 is set in such a way that the entire supply air is routed to the first refrigerant-air heat exchanger 5 after flowing over the third refrigerant-air heat exchanger 8. When flowing over the third refrigerant-air heat exchanger 8, the supply air is preheated and subsequently heated in the first refrigerant-air heat exchanger 5 to a desired temperature for the passenger compartment.

After flowing out of the third refrigerant-air heat exchanger 8, the refrigerant is routed at the second branch-off point 20 into the third flow path 18 to the fourth expansion element 13. When flowing through the fourth expansion element 13, the refrigerant is expanded to the low-pressure level and evaporated and overheated in the second refrigerant-coolant heat exchanger 12 under absorption of heat from the coolant circulating in the second coolant partial circuit 3-2, wherein the coolant is cooled down. The components of the powertrain, in particular the electric powertrain serve as the heat source for the refrigerant which is subsequently sucked in by the compressor 4.

Both the second flow path 17 and the fourth flow path 19, as well as the flow path with the second refrigerant-air heat exchanger 6 are closed and are all not supplied with refrigerant, wherein in particular, the first expansion element 7 and the third expansion element 11, as well as the first shut-off valve 25 and the third shut-off valve 33 are fully closed.

As not shown in FIG. 6B, it is also possible to operate the coolant circuit 3 in parallel to the passive cooling of the battery of the system 1*b*, wherein the coolant is circulated exclusively between the first coolant-heat exchanger 41 and the coolant-air heat exchanger 50, transferring the heat dissipated by the battery to the ambient air.

Figure 6C:
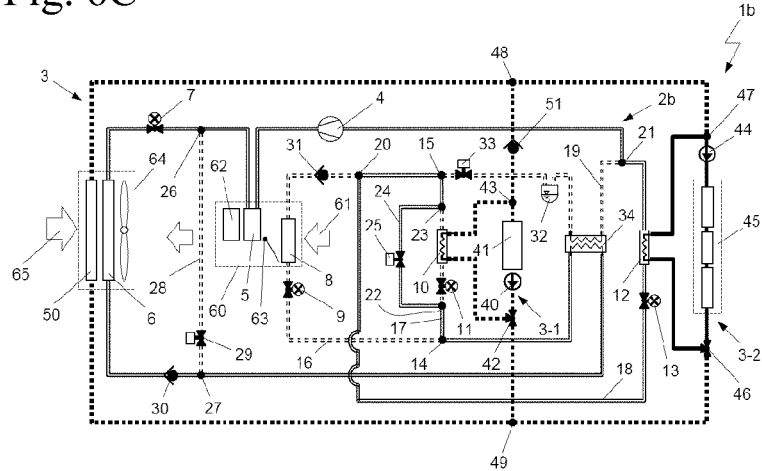
FIG. 6C: The second system according to FIG. 2 during operation of the refrigerant circuit in heating mode with ambient air as the heat source for the refrigerant and with active cooling of the components of the powertrain, in particular of the electric powertrain, and thus as a heat source for the refrigerant.
Figure 6D:
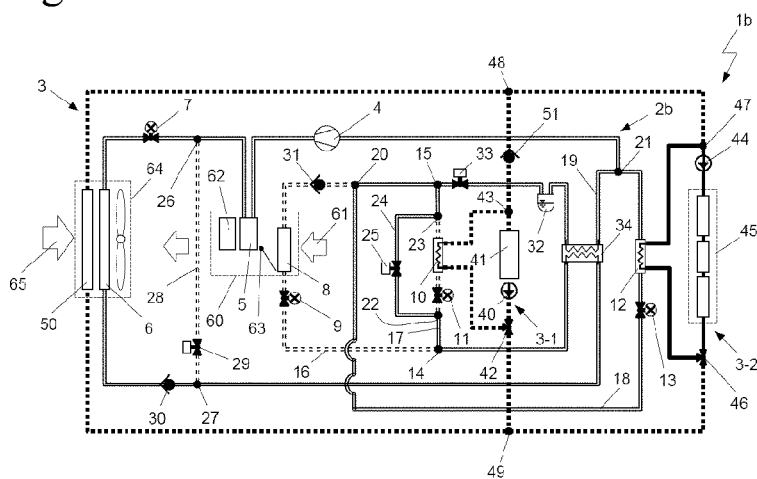
FIG. 6D: The second system according to FIG. 2 during operation of the refrigerant circuit according to FIG. 6C with division of the refrigerant mass flow on the low-pressure side.

During operation of the system 1*b* in accordance with FIG. 2, in particular of the refrigerant circuit 2*b*, in a heating mode with ambient air as the heat source for the refrigerant, as well as with active cooling of the components of the powertrain, in particular the electric powertrain, and thus as the heat source for the refrigerant as shown in the FIGS. 6C and 6D, the high-pressure refrigerant flowing out of the compressor 4 is desuperheated and at least partially liquified in the first refrigerant-air heat exchanger 5 operated as a condenser/gas cooler.

The flow guiding device 63 arranged inside the housing 60 is set in such a way that the supply air flowing through the housing 60 is routed to the first refrigerant-air heat exchanger 5. Consequently, the first refrigerant-air heat exchanger 5 is supplied preferably with the entire air flow of the supply air for the passenger compartment. The supply air for the passenger compartment is heated to a desired temperature.

When flowing through the first expansion element 7, the refrigerant is expanded to a medium-pressure level or the low-pressure level to be able to absorb heat from the ambient air in the second refrigerant-air heat exchanger 6 operated as an evaporator. With setting of the medium-pressure level, the quantity of heat absorbed from the ambient air is regulated. The ambient air is used as the heat source for the refrigerant.

At the first branch-off point 14, the refrigerant is routed exclusively into the second flow path 17, and at the third branch-off point 22 into the first bypass flow path 24 and consequently around the first refrigerant-coolant heat exchanger 10 to be able to minimize a pressure drop on the low-pressure side or the suction side of the refrigerant circuit 2b.

In the operating mode of the system 1b in accordance with FIG. 6C, the refrigerant is routed at the second branch-off point 20 exclusively into the third flow path 18 to the fourth expansion element 13 in order to absorb the maximum heat from the drive components. When flowing through the fourth expansion element 13, the refrigerant is expanded from the medium-pressure level to the low-pressure level and evaporated and overheated in the second refrigerant-coolant heat exchanger 12 under absorption of heat from the coolant circulating in the second coolant partial circuit 3-2, wherein the coolant is cooled down. The components of the powertrain, in particular the electric powertrain serve as the heat source for the refrigerant which is subsequently sucked in by the compressor 4.

While the refrigerant is already expanded to the low-pressure level when it flows through the first expansion element 7, the fourth expansion element 13 is fully opened so that the refrigerant passes the expansion element 13 nearly without pressure losses. The second refrigerant-air heat exchanger 6 and the second refrigerant-coolant heat exchanger 12 are supplied with refrigerant at like pressure level, meaning at the low-pressure level.

Both the first flow path 16 and the part of the second flow path 17 which exhibits the first refrigerant-coolant heat exchanger 10, as well as the fourth flow path 19 and the second bypass flow path 28 around the second refrigerant-air heat exchanger 6 are closed and are all not supplied with refrigerant, wherein in particular, the second expansion element 9 and the third expansion element 11, as well as the second shutoff valve 29 and the third shut-off valve 33 are fully closed.

In the operating mode of the system 1b in accordance with FIG. 6D, the refrigerant is already expanded to the low-pressure level when is flows through the first expansion element 7 and divided on the suction side of the refrigerant circuit 2b into two parallel partial mass flows, in particular to be able to minimize the suction-side pressure loss of the refrigerant, wherein the refrigerant mass flow is divided into one first partial mass flow through the third flow path 18 and one second partial mass flow through the fourth flow path 19. The fourth expansion element 13 is fully opened so that the refrigerant passes the expansion element 13 nearly without pressure losses. The partial mass flows are mixed at the second merging point 21 and sucked in by the compressor 4. As described for the operating mode in accordance with FIG. 6C, the refrigerant of the first partial mass flow is evaporated and overheated in the second refrigerant-coolant heat exchanger 12 under absorption of heat from the coolant circulating in the second coolant partial circuit 3-2. Because the temperature level of the refrigerant is nearly identical on both sides of the circular-internal heat exchanger 34, no heat is transferred in the circular-internal heat exchanger 34.

It is possible to connect the thermal-heat heat exchanger 62 for heating, especially for supplementary heating of the supply air for the passenger compartment for all appropriate operating modes.

With the active cooling of the battery by way of the first coolant partial circuit 3-1 with the first refrigerant-coolant heat exchanger 10 simultaneously with the active cooling of the components of the powertrain by way of the second coolant partial circuit 3-2 with the second refrigerant-coolant heat exchanger 12 and the output of heat as vaporization heat to the refrigerant circuit 2b in both cases, both the waste heat from the battery and the waste heat from the electric drive components can be recovered without mixing the coolant flows with each other. The waste heat in the two aforementioned cases is used as an additional heat source for the system 1b in order to increase the heating power and the efficiency of the thermal system 1b significantly and to increase the functionality of the system 1b.

With the separate formation of the first refrigerant-coolant heat exchanger 10 and the second refrigerant-coolant heat exchanger 12, both the functionality and the efficiency of the thermal system 1b are maximized, compared to a serial arrangement of the refrigerant-coolant heat exchanger 10, 12, in heating mode, thus also minimizing the complexity on the coolant side.

Figure 7:
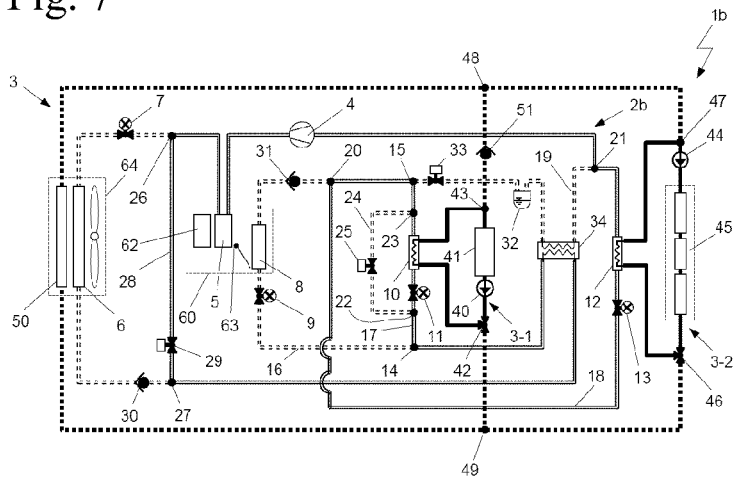
FIG. 7: The second system according to FIG. 2 during operation of the refrigerant circuit with heating of the battery and with active cooling of the components of the powertrain, in particular of the electric powertrain, and thus as a heat source for the refrigerant.

FIG. 7 shows the system 1b according to FIG. 2 during operation of the refrigerant circuit 2b with heating of the battery and with active cooling of the components of the powertrain, in particular the electric powertrain, and thus as a heat source for the refrigerant.

The feeding devices 40, 44 of the coolant circuit 3 are operating, and the coolant partial circuits 3-1, 3-2 are operated independently of each other in such a way that the first coolant-heat exchanger 41 for heating of the battery and the second coolant-heat exchanger 45 for active cooling of the drive components are supplied with coolant independently of each other. The coolant of the first coolant partial circuit 3-1 is circulated between the first refrigerant-coolant heat exchanger 10 and the first coolant-heat exchanger 41, wherein the heat that is output to the battery in the first coolant-heat exchanger 41 is transferred in the first refrigerant-coolant heat exchanger 10 to the coolant circulating in the refrigerant circuit 2b. The coolant of the second coolant partial circuit 3-2 is circulated between the second refrigerant-coolant heat exchanger 12 and the second coolant-heat exchanger 45, wherein the heat that is output in the second coolant-heat exchanger 45 by the drive components to the coolant is transferred in the second refrigerant-coolant heat exchanger 12 to the refrigerant circulating in the refrigerant circuit 2b.

The high-pressure refrigerant flowing out of the compressor 4 is routed through the first refrigerant-air heat exchanger 5 and subsequently the second bypass flow path 28 around the second refrigerant-air heat exchanger 6 in order to minimize a pressure drop on the high-pressure side of the refrigerant circuit 2b.

The flow guiding device 63 arranged inside the housing 60 is set in such a way that the supply air flowing through the housing 60 bypasses the first refrigerant-air heat exchanger 5. The first refrigerant-air heat exchanger 5 is not supplied with the supply air for the passenger compartment so that no heat is transferred in the first refrigerant-air heat exchanger 5.

Furthermore, compared to the system 1*b*, in the case of the system 1*c* according to FIG. 3, it is possible, as known, to route the refrigerant through the third bypass flow path 35 of the refrigerant circuit 2*c* bypassing the first refrigerant-air heat exchanger 5 directly into the second bypass flow path 28 so that the first refrigerant-air heat exchanger 5 is not supplied with refrigerant, additionally resulting in avoiding a pressure drop on the high-pressure side of the refrigerant circuit 2*c* which could be produced when the refrigerant flows through the first refrigerant-air heat exchanger 5.

Subsequently, at the first branch-off point 14, the refrigerant is routed exclusively into the second flow path 17 to the third expansion element 11. The third expansion element 11 is fully opened so that the first refrigerant-coolant heat exchanger 10 is flowed through by refrigerant at high-pressure level. The refrigerant passes the expansion element 11 nearly without pressure losses. The refrigerant is desuperheated, liquified and, if necessary, supercooled in the first refrigerant-coolant heat exchanger 10 operated as a condenser/gas cooler, with output of heat to the coolant, wherein the coolant is heated.

At the second branch-off point 20, the refrigerant is routed exclusively into the third flow path 18 to the fourth expansion element 13. When flowing through the fourth expansion element 13, the refrigerant is expanded to the low-pressure level and evaporated and overheated in the second refrigerant-coolant heat exchanger 12 under absorption of heat from the coolant circulating in the second coolant partial circuit 3-2, wherein the coolant is cooled down. The components of the powertrain, in particular the electric powertrain serve as the heat source for the refrigerant which is subsequently sucked in by the compressor 4.

Both the first flow path 16 and the first bypass flow path 24 of the second flow path 17, as well as the fourth flow path 19 and the flow path with the second refrigerant-air heat exchanger 6 are closed and are all not supplied with refrigerant, wherein in particular, the first expansion element 7 and the second expansion element 9, as well as the first shut-off valve 25 and the third shut-off valve 33 are fully closed.

The invention relates to a system for air-conditioning the air of a passenger compartment and for heat transfer by way of components of a power train, in particular an electric powertrain of a motor vehicle. The system exhibits one coolant circuit with refrigerant-coolant heat exchangers and one coolant-air heat exchanger for heat transfer to the ambient air, as well as one refrigerant circuit. The refrigerant circuit is produced with refrigerant-air heat exchangers used to heat the supply air for the passenger compartment, and for heat transfer by way of the ambient air, as well as with expansion elements, wherein the refrigerant circuit exhibits different flow paths. Furthermore, the invention relates to a method for operating the system.

The invention claimed is:

1. A system for air-conditioning air of a passenger compartment and for heat transfer by way of components of a powertrain of a motor vehicle, the system comprising:
a coolant circuit with a first refrigerant-coolant heat exchanger, a second refrigerant-coolant heat exchanger, and a coolant-air heat exchanger for heat transfer to ambient air; and
a refrigerant circuit further comprising:
a compressor;
a first refrigerant-air heat exchanger for heating supply air for the passenger compartment;
a second refrigerant-air heat exchanger for heat transfer by way of the ambient air, with one upstream first expansion element;
a first flow path with a third refrigerant-air heat exchanger for conditioning the supply air for the passenger compartment, with an upstream second expansion element; and
a second flow path with the first refrigerant-coolant heat exchanger for heat transfer between a coolant used to maintain a temperature for at least one first drive component of the motor vehicle and a refrigerant, with an upstream third expansion element, wherein the first flow path and the second flow path each extend from a first branch-off point up to a first merging point and can be supplied with the refrigerant independently of each other and simultaneously; the refrigerant circuit exhibits a third flow path with the second refrigerant-coolant heat exchanger for cooling of components of the powertrain and an upstream fourth expansion element, wherein the third flow path is arranged in a flow direction of the refrigerant downstream of the first flow path and the second flow path.

2. The system according to claim 1, wherein the refrigerant circuit in the second flow path is produced with a first bypass flow path around the first refrigerant-coolant heat exchanger and the third expansion element.

3. The system according to claim 2, wherein the first bypass flow path around the first refrigerant-coolant heat exchanger and the third expansion element exhibits a shutoff valve.

4. The system according to claim 1, wherein the refrigerant circuit exhibits a fourth flow path, wherein the third flow path and the fourth flow path are produced in such a way that they can be supplied with refrigerant independently of each other and simultaneously.

5. The system according to claim 4, wherein the fourth flow path is produced with a shut-off valve and an accumulator.

6. The system according to claim 5, wherein the refrigerant circuit is produced with a second bypass flow path around the second refrigerant-air heat exchanger for heat transfer by way of the ambient air and the first expansion element, which extends from a second branch-off point to a second merging point, wherein the second branch-off point is arranged between the first refrigerant-air heat exchanger for heating the supply air for the passenger compartment and the first expansion element arranged upstream of the second refrigerant-air heat exchanger for heat transfer by way of the ambient air, and the second merging point is arranged between the second refrigerant-air heat exchanger for heat transfer by way of the ambient air and the first branch-off point.

7. The system according to claim 6, wherein the second bypass flow path around the second refrigerant-air heat exchanger for heat transfer by way of the ambient air and the first expansion element exhibits a shut-off valve.

8. The system according to claim 7, wherein the refrigerant circuit exhibits a circular-internal heat exchanger which is arranged, on one hand, between the second refrigerant-air heat exchanger for heat transfer by way of the ambient air and the first branch-off point of the first flow path and the second flow path and, on another hand, inside the fourth flow path.

9. The system according to claim 6, wherein the refrigerant circuit exhibits a third bypass flow path around the first refrigerant-air heat exchanger for heating the supply air for the passenger compartment, which extends from a third branch-off point up to a third merging point, wherein the third branch-off point is produced between the compressor and the first refrigerant-air heat exchanger and the third merging point between the first refrigerant-air heat exchanger and the first expansion valve that is arranged upstream of the second refrigerant-air heat exchanger for heat transfer by way of the ambient air.

10. The system according to claim 1, wherein the coolant circuit exhibits two coolant partial circuits which are thermally coupled with the refrigerant circuit, wherein the first refrigerant-coolant heat exchanger is produced as a thermal connection between the refrigerant circuit and a first one of the coolant partial circuits of the coolant circuit and the second refrigerant-coolant heat exchanger as a thermal connection between the refrigerant circuit and a second one of the coolant partial circuits of the coolant circuit.

11. The system according to claim 10, wherein the first one of the coolant partial circuits is produced with a first feeding device and a first coolant-heat exchanger.

12. The system according to claim 11, wherein the first coolant-heat exchanger is produced to maintain a temperature of a component of the powertrain of the motor vehicle.

13. The system according to claim 12, wherein the first one of the coolant partial circuits is embedded in the coolant circuit via a second branch-off point and a second merging point.

14. The system according to claim 13, wherein the second one of the coolant partial circuits is produced with a second feeding device and a second coolant-heat exchanger.

15. The system according to claim 14, wherein the second coolant-heat exchanger is produced to cool components of the powertrain of the motor vehicle.

16. The system according to claim 15, wherein the second one of the coolant partial circuits is embedded in the coolant circuit via a third branch-off point and a third merging point.

17. The system according to claim 16, wherein the first one of the coolant partial circuits and the second one of the coolant partial circuits, each at the second merging point and the third merging point, are connected to a first connection of the coolant circuit, and at the second branch-off point and the third branch-off point to a second connection of the coolant circuit so that the first coolant heat exchanger and the second coolant heat exchanger are connected to the coolant-air heat exchanger.

18. A method for operating the system for air-conditioning the air of the passenger compartment and for heat transfer by way of drive components of the motor vehicle according to claim 1 in a heating mode of the supply air for the passenger compartment by way of components of the powertrain as the heat source, exhibiting the following steps:
transfer of heat from the refrigerant, which circulates in the refrigerant circuit at a high-pressure level, when flowing through the first refrigerant-air heat exchanger operated as a condenser/gas cooler to the supply air for the passenger compartment, wherein the supply air is heated to a final temperature;
routing of the refrigerant through the first flow path, wherein the refrigerant passes the fully opened second expansion element nearly without pressure losses, and heat is transferred in the third refrigerant-air heat exchanger operated as a condenser/gas cooler to the supply air for the passenger compartment, wherein the supply air is preheated, and
routing of the refrigerant through the third flow path, wherein the refrigerant is expanded to a low-pressure level when flowing through the fourth expansion element and is evaporated and overheated in the second refrigerant-coolant heat exchanger under absorption of heat from the coolant circulating in a second coolant partial circuit of the coolant circuit, wherein the coolant is cooled down.

19. A method for operating the system for air-conditioning the air of the passenger compartment and for heat transfer by way of drive components of the motor vehicle according to claim 1 in a heating mode of the supply air for the passenger compartment by way of ambient air and components of the powertrain as the heat sources, exhibiting the following steps:
transfer of heat from the refrigerant, which circulates in the refrigerant circuit at a high-pressure level, when flowing through the first refrigerant-air heat exchanger operated as a condenser/gas cooler to the supply air for the passenger compartment, wherein the supply air is heated up to a final temperature;
expansion of the refrigerant to a medium-pressure level or a low-pressure level when flowing through the first expansion element and transfer of heat from the ambient air to the refrigerant when flowing through the second refrigerant-air heat exchanger operated as an evaporator, wherein a quantity of the heat absorbed from the ambient air is regulated by way of a medium-pressure level, and
routing of the refrigerant through the third flow path, wherein the refrigerant is expanded from the medium-pressure level to the low-pressure level when flowing through the fourth expansion element or the fourth expansion element is fully opened and the refrigerant is evaporated and overheated in the second refrigerant-coolant heat exchanger under absorption of heat from the coolant circulating in a second coolant partial circuit of the coolant circuit, wherein the coolant is cooled down.

20. The method according to claim 19, wherein the refrigerant on a suction side of the refrigerant circuit is divided into a first partial mass flow through the third flow path and a second partial mass flow through a fourth flow path, which are mixed at a second merging point and sucked in by the compressor.

21. A method for operating the system for air-conditioning the air of the passenger compartment and for heat transfer by way of drive components of the motor vehicle according to claim 1 in a mode of heating of a battery, exhibiting the following steps:
routing of the refrigerant circulating in the refrigerant circuit at a high-pressure level through the second flow path, wherein the refrigerant passes the fully opened third expansion element, and heat is transferred in the first refrigerant-coolant heat exchanger operated as a condenser/gas cooler to the coolant circulating in a first coolant partial circuit, wherein the coolant is heated and the heated coolant is fed to the drive component to be heated, and
routing of the refrigerant through the third flow path, wherein the refrigerant is expanded to a low-pressure level when flowing through the fourth expansion element and is evaporated and overheated in the second refrigerant-coolant heat exchanger under absorption of heat from the coolant circulating in a second coolant partial circuit of the coolant circuit, wherein the coolant is cooled down.

22. The method according to claim 21, wherein the cooled-down coolant is fed to at least one component of the powertrain, and the component is cooled.

23. A use of the system according to claim 1 in the motor vehicle driven by an electric motor or with a hybrid drive consisting of an electric motor and a combustion engine.

* * * * *